United States Patent
Tomasi et al.

(10) Patent No.: US 7,478,825 B2
(45) Date of Patent: Jan. 20, 2009

(54) FRAME WITH TELESCOPIC CLOSURE, PARTICULARLY FOR PUSHCHAIRS OR THE LIKE

(75) Inventors: Ivan Tomasi, Sovizzo (IT); Lino Groppo, Sovizzo (IT)

(73) Assignee: L'Inglesina Baby S.p.A., Altavilla Vicentina (IT)

( * ) Notice: Subject to any disclaimer, the term of this patent is extended or adjusted under 35 U.S.C. 154(b) by 0 days.

(21) Appl. No.: 10/544,837

(22) PCT Filed: Dec. 22, 2003

(86) PCT No.: PCT/EP03/14710
§ 371 (c)(1),
(2), (4) Date: Aug. 8, 2005

(87) PCT Pub. No.: WO2004/074070
PCT Pub. Date: Sep. 2, 2004

(65) Prior Publication Data
US 2006/0145441 A1 Jul. 6, 2006

(30) Foreign Application Priority Data
Feb. 21, 2003 (IT) .................. VR20030007 U (51) Int. Cl.
*B62B 7/06* (2006.01)
(52) U.S. Cl. .............. 280/642; 280/643; 280/644; 280/647; 280/658; 280/47.38; 280/47.41
(58) Field of Classification Search .......... 280/642–644, 280/647, 658, 47.38, 47.41
See application file for complete search history.

(56) References Cited

U.S. PATENT DOCUMENTS

| 4,256,325 A | * | 3/1981 | Fleischer | 280/649 |
| 4,294,464 A | * | 10/1981 | Ettridge | 280/649 |
| 4,426,113 A | * | 1/1984 | Schutz | 297/440.11 |
| 4,428,598 A | * | 1/1984 | Kassai | 280/644 |
| 4,449,732 A | * | 5/1984 | Surot | 280/644 |
| 4,681,340 A | * | 7/1987 | Pasquini | 280/642 |
| 4,844,504 A | * | 7/1989 | Bigo | 280/642 |
| 5,356,171 A | * | 10/1994 | Schmidlin et al. | 280/650 |
| 5,490,685 A | | 2/1996 | Kitayama et al. | |

(Continued)

FOREIGN PATENT DOCUMENTS

DE 89 12 503 U 1/1990

(Continued)

*Primary Examiner*—Christopher Ellis
*Assistant Examiner*—Cynthia F. Collado
(74) *Attorney, Agent, or Firm*—Modiano & Associati; Albert Josif; Daniel J. O'Byrne (57) ABSTRACT

A frame with telescopic closure particularly for pushchairs or the like, comprising two front posts and two rear posts that are connected in a downward region to respective wheels and are kinematically connected to each other, the frame being provided in an upward region with two handle posts that can move with respect to the front posts and the rear posts in order to pass from an extended active position to a retracted folding position, the frame further comprising two upper auxiliary posts, each of which is connected rigidly to a respective handle post and has at least one engagement portion for a corresponding lateral covering wing that is connected to a corresponding side of the back of a seat that is supported by the frame.

12 Claims, 6 Drawing Sheets

U.S. PATENT DOCUMENTS

| | | | | |
|---|---|---|---|---|
| 5,662,380 A | * | 9/1997 | Tam et al. | 297/354.12 |
| 5,938,230 A | | 8/1999 | Huang et al. | |
| 6,394,633 B1 | * | 5/2002 | Perez | 362/459 |
| 2003/0011155 A1 | | 1/2003 | Hsia | |

FOREIGN PATENT DOCUMENTS

| | | |
|---|---|---|
| FR | 2 777 253 A | 10/1999 |
| GB | 1 176 516 A | 1/1970 |
| GB | 2 033 309 A | 5/1980 |

* cited by examiner

FRAME WITH TELESCOPIC CLOSURE, PARTICULARLY FOR PUSHCHAIRS OR THE LIKE

TECHNICAL FIELD

The present invention relates to a frame with telescopic closure, particularly for pushchairs or the like.

BACKGROUND ART

Pushchairs are currently widely used being provided with a frame with telescopic closure, which can be folded also along its height so as to assume a very limited size once folded.

These frames are usually formed by two front posts and two rear posts, which are associated in a downward region with respective wheels and are kinematically connected to each other by way of articulation structures, and by two upper posts that act as handles (commonly known as handle tubes), each of which slidingly engages a respective seat that is generally provided on the articulation structures in order to be able to pass from an extended position for use to a retracted folding position, by way of a downward translational motion.

Pushchairs are also currently commercially available being provided with a seat, which is provided with a back that has, at its sides, lateral wings, usually made of fabric, that are designed to be coupled to the handle tubes in order to achieve the dual advantage of a "sleep" configuration, i.e., in which the back is lowered, said configuration being more protected thanks to the covering action performed by such lateral wings, and of an adjustment of the back, which is achieved by using the coupling of the back to the handle tubes by means of strap systems that are integrated in the seat and are structurally far simpler, lighter, and more inexpensive than conventional adjustment systems that provide for racks and rigid back structures.

However, seats of this type cannot be applied to frames with telescopic closure, since the coupling of the lateral wings to the handle tubes would hinder free translational motion of the handle tubes during folding of the pushchair.

DISCLOSURE OF THE INVENTION

The aim of the present invention is to provide a valid solution to the technical problem described above by providing a frame with telescopic closure particularly for pushchairs or the like, to which it is possible to apply a back of the type described above provided with lateral wings.

Within this aim, an object of the present invention is to provide a frame with telescopic closure that has a very simple structure so as to be competitive from the economical standpoint.

Another object of the present invention is to provide a frame with telescopic closure that is easy and practical to use.

This aim and these and other objects that will become better apparent hereinafter are achieved by a frame with telescopic closure particularly for pushchairs or the like according to the invention, comprising two front posts and two rear posts that are connected in a downward region to respective wheels and are kinematically connected to each other, said frame being provided in an upward region with two handle posts movable with respect to said front posts and said rear posts in order to pass from an extended active position to a retracted folding position, characterized in that it comprises two upper auxiliary posts, each of which is connected rigidly to a respective handle post and has at least one engagement portion for a corresponding lateral covering wing that is connected to a corresponding side of the back of a seat that is supported by said frame.

BRIEF DESCRIPTION OF THE DRAWINGS

Further characteristics and advantages of the invention will become better apparent from the description of some preferred but not exclusive embodiments of a frame with telescopic closure particularly for pushchairs or the like according to the invention, illustrated by way of non-limiting example in the accompanying drawings, wherein.

WAYS OF CARRYING OUT THE INVENTION

In the examples of embodiment that follow, individual characteristics, given in relation to specific examples, may actually be interchanged with other different characteristics that exist in other examples of embodiments.

With reference to the figures, the frame with telescopic closure particularly for pushchairs or the like according to the invention, generally designated by the reference numeral 1, comprises two front posts 2a and 2b and two rear posts 3a and 3b, which are associated in a downward region with respective wheels 4.

The front posts 2a and 2b are kinematically connected by respective articulation elements 5a and 5b to the rear posts 3a and 3b respectively.

Each one of the articulation elements 5a and 5b is constituted by a main body 6, to which the upper ends of the front posts 2a and 2b and of the rear posts 3a and 3b are articulated on opposite sides.

The articulation elements 5a and 5b further perform the additional task of slidingly supporting respective handle posts 7a and 7b, which are arranged substantially in the region of the frame 1 that lies upward during use and end in an upward region with a portion that can be gripped by the user.

Thanks to the sliding coupling with the articulation elements 5a and 5b, the handle posts 7a and 7b can move with respect to the front posts 2a and 2b and to the rear posts 3a and 3b in order to pass from an extended active position to a retracted folded position.

In practice, respective supporting seats 8a and 8b are provided at both of the articulation elements 5a and 5b and slidingly engage and guide the handle posts 7a and 7b respectively.

The handle posts 7a and 7b and the front posts 2a and 2b may further be connected by way of linkages 100 at their ends that are arranged downward during use.

According to the invention two upper auxiliary posts 9a and 9b are provided that are rigidly associated with the handle posts 7a and 7b respectively.

According to the invention, each one of said upper auxiliary posts 9a and 9b has at least one engagement portion, which is adapted to be engaged by a corresponding lateral covering wing 11 connected to a corresponding side of the back of a seat 12 that is supported by the frame 1.

In particular, the upper auxiliary posts 9a and 9b are conveniently arranged at least partially so that they are substantially parallel and spaced with respect to the respective handle posts 7a and 7b with which they are associated.

In greater detail, each one of said upper auxiliary posts 9a and 9b can advantageously have a lower end that is connected to the respective handle post 7a or 7b and a free upper end portion, substantially at which said engagement portion for the respective lateral covering wing 11 is located.

For example, on the lateral covering wings 11 it is possible to provide sleeves 11a and 11b that are adapted to be fitted over the upper auxiliary posts 9a and 9b and in practice are inserted therein with their free upper end portion.

Figure 5:
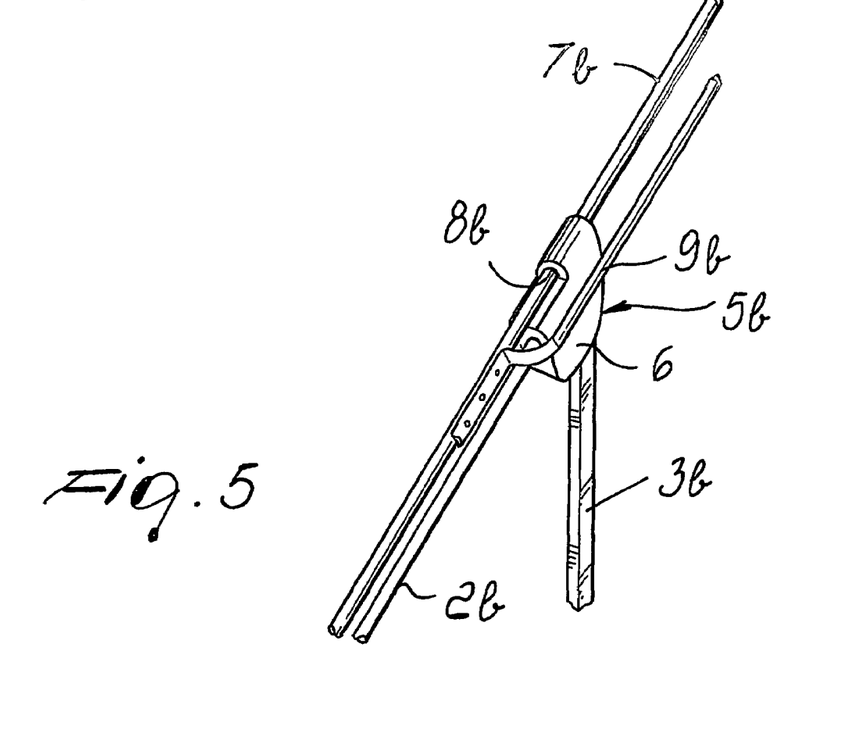
FIG. 5 is a partial perspective view of one of the handle posts in association with an articulation element that is connected to one of the front posts and to one of the rear posts, and of one of the upper auxiliary posts in a possible embodiment.

In order to avoid any hindrance of the retracting motion of the handle posts 7a and 7b, the point where the upper auxiliary posts 9a and 9b are connected to the respective handle posts 7a and 7b is advantageously located downward with respect to the articulation elements 5a and 5b, as shown in FIG. 5.

In this manner, during folding of the frame 1 the upper auxiliary posts 9a and 9b do not interfere with the articulation elements 5a and 5b and sliding of the handle posts 7a and 7b guided by the supporting seats 8a and 8b is ensured.

Figure 1:
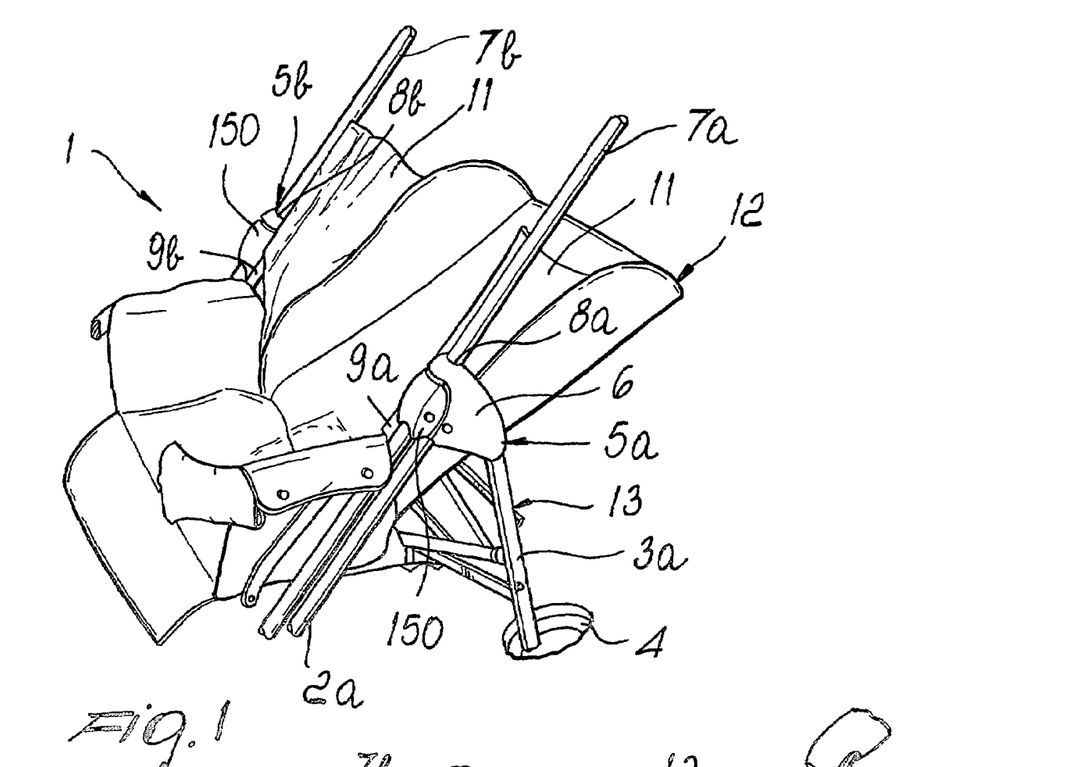
FIG. 1 is a perspective view of the frame according to the invention, with parts shown only partially and other parts omitted.
Figure 2:
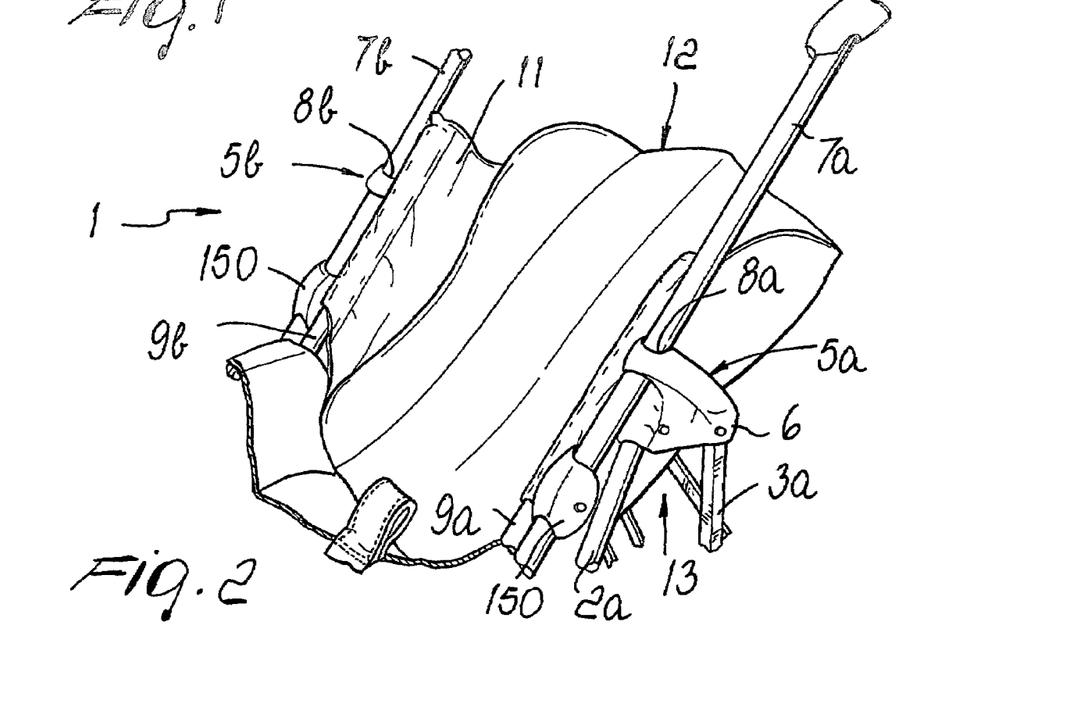
FIG. 2 is a partial perspective view of the frame according to the invention during folding.
Figure 3:
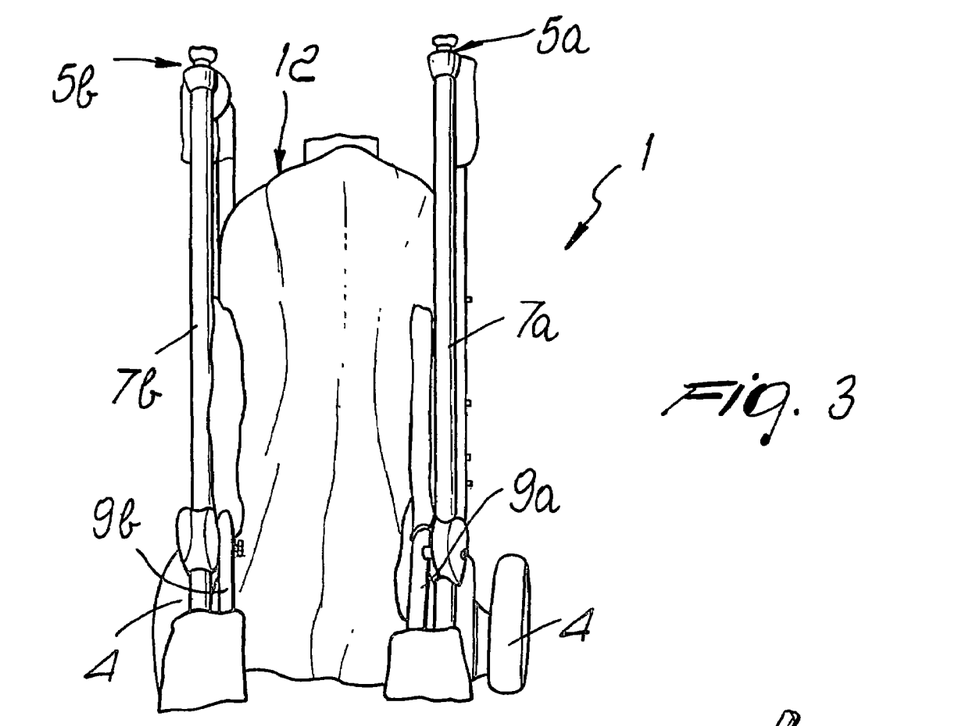
FIG. 3 is a front elevation view of the frame according to the invention in the folded condition.
Figure 4:
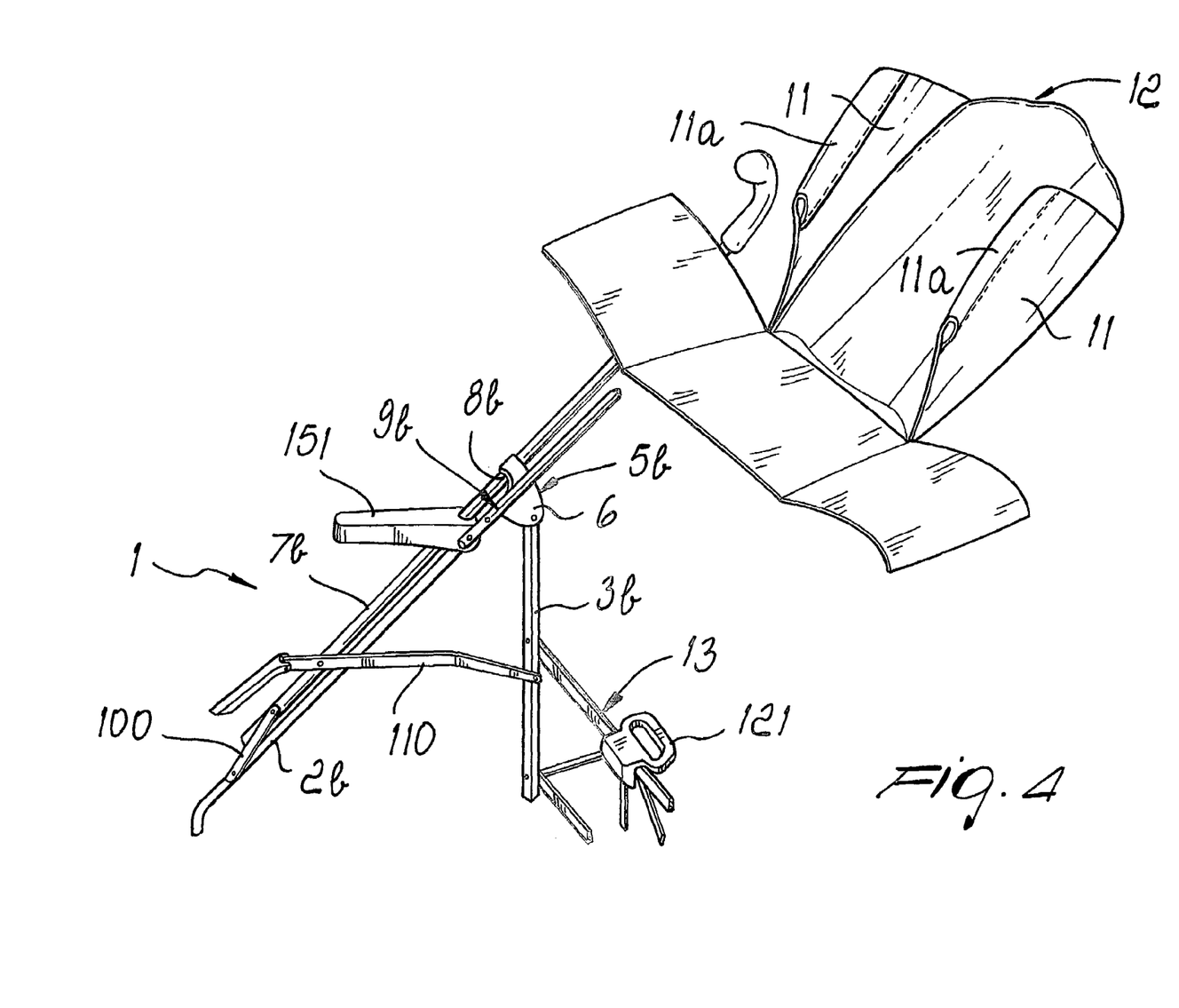
FIG. 4 is a partial perspective view of the frame according to the invention, with the seat shown separate for the sake of greater clarity, and with one mode of coupling of the upper auxiliary posts to the respective handle posts.

With reference to FIGS. 1 and 2, the upper auxiliary posts 9a and 9b can be connected, at their respective lower end, to blocks 150, which are provided on the handle posts 7a and 7b for merely aesthetic purposes or, as shown in FIG. 4, can be fixed to armrests 151, which are rigidly coupled to the handle posts 7a and 7b, or can be fixed directly to the handle posts 7a and 7b as shown in FIG. 5.

Conveniently, the rear posts 3a and 3b can be connected by an articulated structure 13 that is known per se and which, by using a double parallelogram, is adapted to allow the umbrella-like folding of the frame 1 in order to ensure its easy transport when not in use.

Furthermore, as shown in FIG. 4, there is a stiffening rod 110, which connects the front posts 2a and 2b respectively to the rear posts 3a and 3b and acts as a lower supporting framework for the seat 12. Such stiffening rod 110 is part of the known per se general kinematic layout of telescopic frames.

Figure 6:
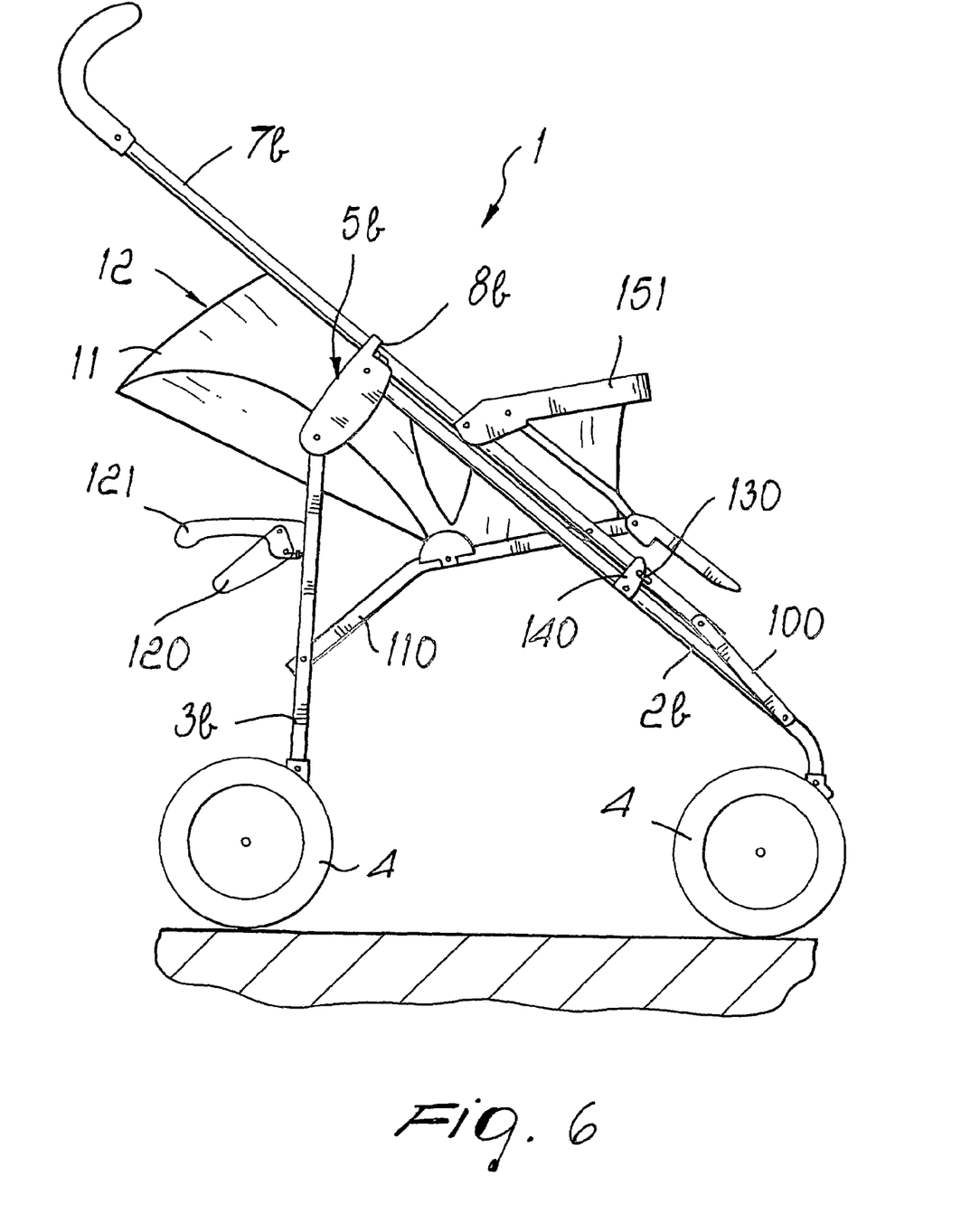
FIG. 6 is a side elevation view of the frame according to the invention.
Figure 7:
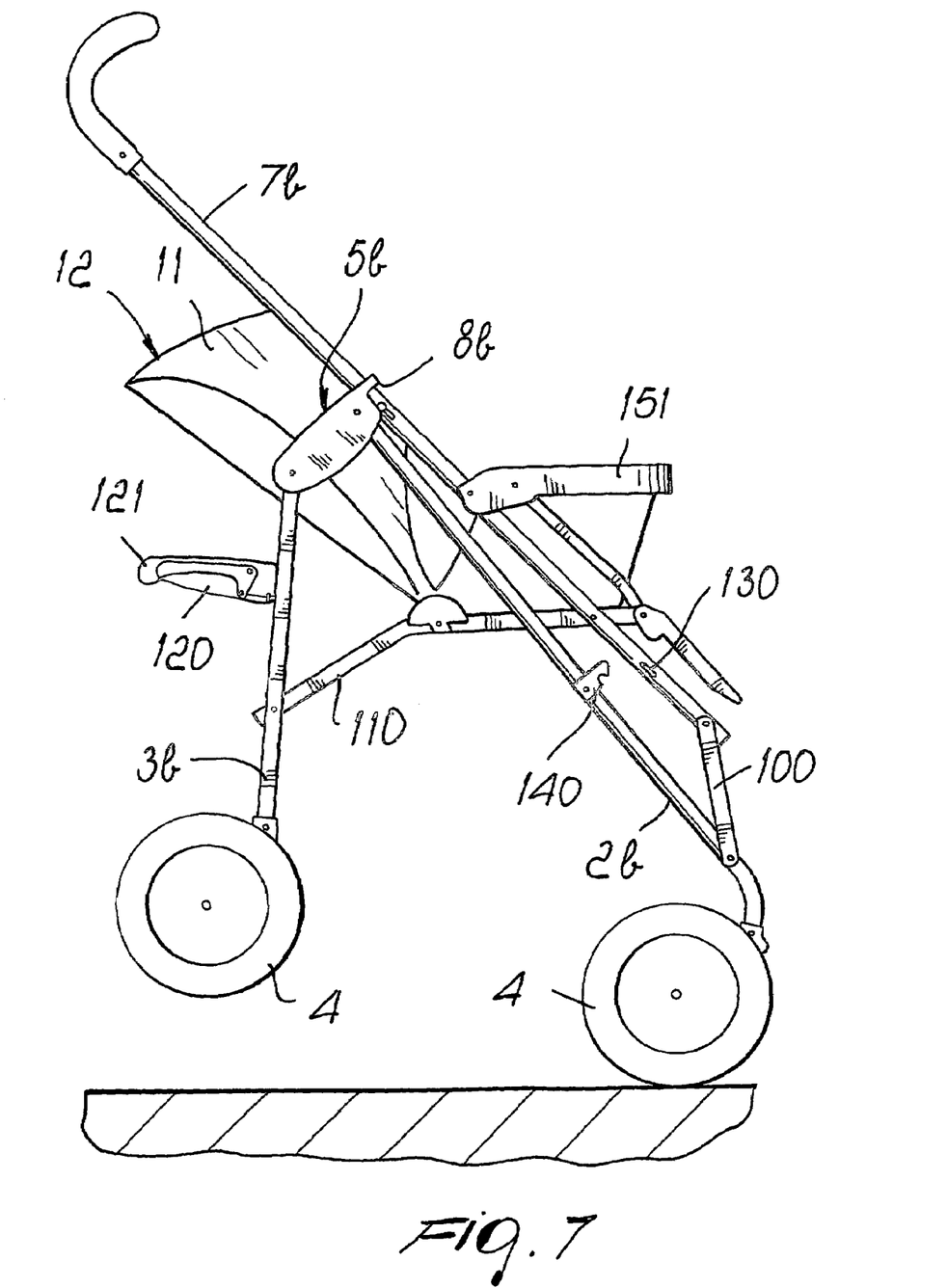
FIG. 7 is a side elevation view of the frame according to the invention during folding.
Figure 8:
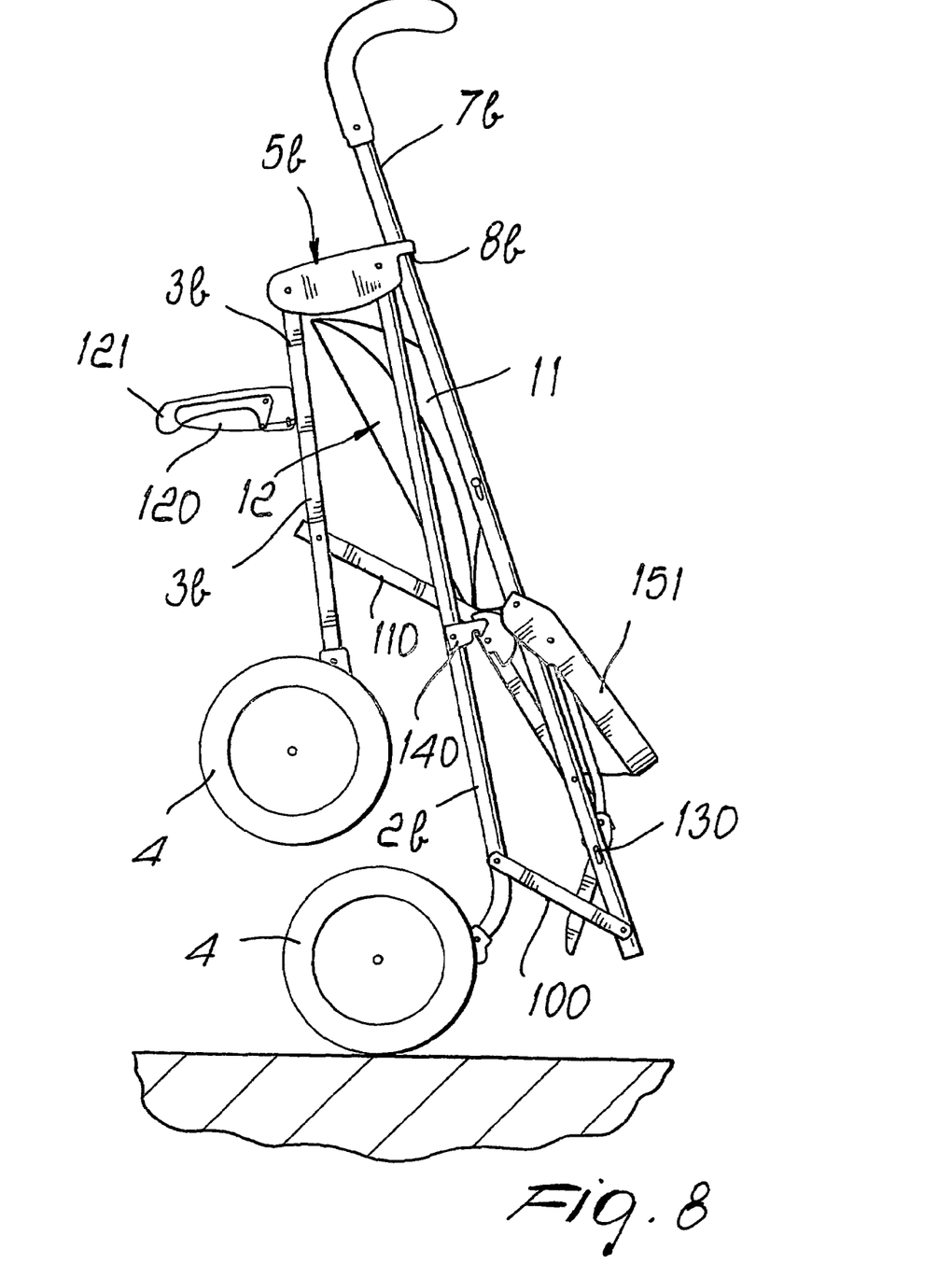
FIG. 8 is a side elevation view of the frame according to the invention in the folded condition.

With reference to FIGS. 4, 5 and 6, in a currently preferred embodiment the frame 1 is provided with an actuation lever 120 that is located at a rear handle 121 and is adapted to actuate means for locking the frame 1 in an open condition, which are provided with pivots 130 that can slide along the longitudinal axis of the handle posts 7a and 7b and are adapted to engage respective retention hooks 140 that are fitted on the front posts 2a and 2b.

Furthermore, in order to achieve evident advantages in terms of light weight and production cost, in one example of embodiment the front posts 2a and 2b, the rear posts 3a and 3b, the handle posts 7a and 7b and the specific upper auxiliary posts 9a and 9b can be constituted by tubular elements.

Advantageously, the seat 12 can be provided with a low-cost back adjustment system constituted by at least one strap that is fixed at its ends to the upper auxiliary posts 9a and 9b or to the lateral covering wings 11 of the back and is provided with conventional length adjustment means.

From what has been described above it is therefore evident that the invention achieves the intended aim and objects and in particular the fact is stressed that it allows to apply also to telescopic-frame pushchairs seats of the type with a lateral covering on their sides, thanks to the presence of the particular upper auxiliary posts 9a and 9b, which are rigidly coupled to the handle posts 7a and 7b but are not engaged by the articulation elements 5a and 5b and form at least one coupling portion for the lateral covering wings 11, which is located substantially at one of their free end portions, as in the case of the example of the embodiment shown in the figures.

Moreover, it has been noted that during folding of the frame 1 the lateral covering wings 11, by being fixed to the upper auxiliary posts 9a and 9b, move with respect to the front posts 2a and 2b and to the rear posts 3a and 3b and in particular with respect to the articulation elements 5a and 5b, following the folding motion of the handle posts 7a and 7b and maintaining their relative position with respect to them, without however interfering in any way with the articulation elements 5a and 5b.

The invention thus conceived is susceptible of numerous modifications and variations, all of which are within the scope of the appended claims.

Thus, for example, one or both of the upper auxiliary posts 9a and 9b can be connected to the respective handle posts 7a and 7b at their upper and lower ends respectively, thus obtaining a substantially central portion of the upper auxiliary posts 9a and 9b that is advantageously parallel and spaced with respect to the respective handle post 7a or 7b and provides one or more engagement portions for the lateral covering wings 11.

Conveniently, also within the scope of this constructive embodiment, in order to allow free translational motion of the handle posts 7a and 7b, the points on the handle posts 7a and 7b at which said upper and lower ends of the auxiliary posts 9a and 9b are fixed are located respectively above and below the corresponding articulation elements 5a and 5b.

According to another embodiment that is conceptually similar to the one described, the upper auxiliary posts 9a and 9b can be connected to the respective handle posts at one of their upper ends, while the engagement portion for the covering wings 11 is formed at a free lower end portion.

In this case, the point where the auxiliary posts 9a and 9b are connected to the handle posts 7a and 7b is conveniently provided above the corresponding articulation elements 5a and 5b.

All the characteristics of the invention described above as advantageous, convenient or the like may also be omitted or be replaced by equivalents.

In practice, the materials used, as well as the contingent shapes and dimensions, may be any according to requirements.

The disclosures in Italian Utility Model Application No. VR2003U000007 from which this application claims priority are incorporated herein by reference.

What is claimed is:

1. A frame with telescopic closure for pushchairs, comprising two front posts and two rear posts that are connected in a downward region to respective wheels and are kinematically connected to each other, said frame being provided in an upward region with two handle posts movable with respect to said front posts and said rear posts in order to pass from an extended active position to a retracted folding position, further comprising two upper auxiliary posts, each of which is fixedly connected with a respective handle post and has at least one engagement portion for a corresponding lateral covering wing that is connected to a corresponding side of the back of a seat that is supported by said frame, each one of said upper auxiliary posts is shaped at least partially so that it is parallel and spaced with respect to said respective handle post, at least one of said upper auxiliary posts comprises a lower end that is connected to the respective handle post and a free upper end portion, at which said at least one engagement portion is arranged.

2. The frame according to claim 1, wherein at least one of said upper auxiliary posts has an upper end and a lower end, both of which are connected to the respective handle post, and further comprises a substantially central portion that is spaced and parallel with respect to the respective handle post, said at least one engagement portion being provided substantially at said substantially central portion.

3. The frame according to claim 1, wherein at least one of said upper auxiliary posts comprises an upper end that is connected to the respective handle post and a free lower end portion, said at least one engagement portion being located substantially thereat.

4. The frame according to claim 1, further comprising two articulation elements that are interposed between said pair affront posts and said pair of rear posts, each element connecting a respective front post to a respective rear post, each one of said articulation elements slidingly supporting a corresponding handle post.

5. The frame according to claim 4, wherein each one of said articulation elements comprises a main body to which said respective rear past is pivoted, said main body fanning a supporting seat that is slidingly engaged by said corresponding handle post.

6. The frame according to claim 1, wherein the point where said at least one of said upper auxiliary pasts is connected to the respective handle post is located in a downward region with respect to the articulation element that supports the respective handle post of said at least one of said upper auxiliary posts.

7. The frame according to claim 2, wherein the points where said upper end and said lower end are connected to the respective handle post of said at least one of said upper auxiliary posts are located respectively in an upward region and in a downward region with respect to the articulation element that supports the respective handle post of said at least one of said upper auxiliary posts.

8. The frame according to claim 3, wherein the point where said upper end is connected to the respective handle post of said at least one of said upper auxiliary posts is arranged upward with respect to the articulation element that supports the respective handle post of said at least one of said upper auxiliary pasts.

9. The frame according to claim 1, further comprising an articulated structure that connects said two rear posts and is adapted to allow an umbrella-like folding of said frame.

10. The frame according to claim 1, wherein said front posts, said rear posts, said handle posts and said upper auxiliary posts are constituted by tubular elements.

11. A frame with telescopic closure for pushchairs, comprising two front posts and two rear posts that are connected in a downward region to respective wheels and are kinematically connected to each other, said frame being provided in an upward region with two handle posts movable with respect to said front posts and said rear posts in order to pass from an extended active position to a retracted folding position, further comprising two upper auxiliary posts, each of which is fixedly connected with a respective handle post and has at least one engagement portion for a corresponding lateral covering wing that is connected to a corresponding side of the back of a seat that is supported by said frame, each one of said upper auxiliary posts is shaped at least partially so that it is parallel and spaced with respect to said respective handle post, the frame further comprising two articulation elements that are interposed between said pair of front posts and said pair of rear posts, each element connecting a respective front post to a respective rear post, each one of said articulation elements slidingly supporting a corresponding handle post, each one of said articulation elements comprises a main body to which said respective rear post is pivoted said main body forming a supporting seat that is slidingly engaged by said corresponding handle post.

12. A frame with telescopic closure for pushchairs, comprising two front posts and two rear posts that are connected in a downward region to respective wheels and are kinematically connected to each other, said frame being provided in an upward region with two handle posts movable with respect to said front posts and said rear posts in order to pass from an extended active position to a refracted folding position, further comprising two upper auxiliary posts, each of which is fixedly connected with a respective handle post and has at least one engagement portion for a corresponding lateral covering wing that is connected to a corresponding side of the back of a seat that is supported by said frame and further comprising an articulated stricture that connects said two rear posts and is adapted to allow an umbrella-like folding of said frame.

* * * * *